US007158623B1

(12) United States Patent
D'Silva et al.

(10) Patent No.: US 7,158,623 B1
(45) Date of Patent: *Jan. 2, 2007

(54) METHOD AND APPARATUS FOR DIAL STREAM ANALYSIS

(75) Inventors: Alin D'Silva, Waltham, MA (US); Shaygan Kheradpir, Waban, MA (US)

(73) Assignee: Verizon Data Services Inc., Irving, TX (US)

( * ) Notice: Subject to any disclaimer, the term of this patent is extended or adjusted under 35 U.S.C. 154(b) by 578 days.

This patent is subject to a terminal disclaimer.

(21) Appl. No.: 10/084,002

(22) Filed: Feb. 27, 2002

Related U.S. Application Data

(60) Provisional application No. 60/276,505, filed on Mar. 19, 2001, provisional application No. 60/275,031, filed on Mar. 13, 2001, provisional application No. 60/275,020, filed on Mar. 13, 2001, provisional application No. 60/275,719, filed on Mar. 13, 2001, provisional application No. 60/275,667, filed on Mar. 13, 2001, provisional application No. 60/272,167, filed on Feb. 27, 2001, provisional application No. 60/272,122, filed on Feb. 27, 2001.

(51) Int. Cl.
*H04M 3/22* (2006.01)
*H04M 3/42* (2006.01)

(52) U.S. Cl. ............ 379/201.01; 379/32.01; 379/207.02; 379/265.06; 379/266.1

(58) Field of Classification Search ............ 379/201.01, 379/201.02, 32.01, 32.02, 32.03, 32.04, 207.02, 379/265.06, 265.07, 265.08, 266.1
See application file for complete search history.

(56) References Cited

U.S. PATENT DOCUMENTS 4,013,839 A * 3/1977 Bell ........................... 379/140
4,540,850 A    9/1985 Herr et al.

(Continued)

FOREIGN PATENT DOCUMENTS

EP        0818908 A3    1/1998

(Continued)

OTHER PUBLICATIONS

"FAQ Premium Home Answer" eVoice, http://content.evoice.com/wcs/signUp/FAQ_premHA_s01.htm.

(Continued)

*Primary Examiner*—Harry S. Hong

(57) ABSTRACT

Interests of a person may be analyzed based on the dial stream to/from the person. When a call is being made to/from a person, signaling information from the dial stream is routed to an analysis server. Information in the signaling information, such as called party identifier and caller-id data, is retrieved and archived by the analysis server. Based on the information in the dial stream, a person's interests may then be analyzed and provided to a recipient, such as a business. The person may be compensated in exchange for allowing their dial stream to be analyzed. In addition, businesses may also register with the analysis server.

24 Claims, 10 Drawing Sheets

U.S. PATENT DOCUMENTS

| | | | |
|---|---|---|---|
| 4,600,814 A * | 7/1986 | Cunniff et al. | 379/92.03 |
| 4,734,931 A * | 3/1988 | Bourg et al. | 379/93.01 |
| 5,327,486 A | 7/1994 | Wolff et al. | |
| 5,440,624 A | 8/1995 | Schoof | |
| 5,623,541 A * | 4/1997 | Boyle et al. | 379/221.15 |
| 5,631,904 A | 5/1997 | Fitser et al. | |
| 5,652,789 A | 7/1997 | Miner et al. | |
| 5,724,412 A | 3/1998 | Srinivasan | |
| 5,805,670 A * | 9/1998 | Pons et al. | 379/45 |
| 5,872,841 A | 2/1999 | King et al. | |
| 5,875,242 A | 2/1999 | Glaser et al. | |
| 5,903,845 A | 5/1999 | Buhrmann et al. | |
| 5,907,547 A | 5/1999 | Foladare et al. | |
| 6,058,163 A * | 5/2000 | Pattison et al. | 379/265.06 |
| 6,134,318 A * | 10/2000 | O'Neil | 379/266.01 |
| 6,192,123 B1 | 2/2001 | Grunsted et al. | |
| 6,219,413 B1 | 4/2001 | Burg | |
| 6,226,374 B1 | 5/2001 | Howell et al. | |
| 6,301,609 B1 | 10/2001 | Aravamudan et al. | |
| 6,310,947 B1 | 10/2001 | Polcyn | |
| 6,351,279 B1 * | 2/2002 | Sawyer | 348/14.07 |
| 6,371,484 B1 * | 4/2002 | Yuan | 273/292 |
| 6,389,113 B1 * | 5/2002 | Silverman | 379/35 |
| 6,411,605 B1 | 6/2002 | Vance et al. | |
| 6,430,289 B1 | 8/2002 | Liffick | |
| 6,442,245 B1 | 8/2002 | Castagna et al. | |
| 6,459,780 B1 | 10/2002 | Wurster et al. | |
| 6,463,145 B1 | 10/2002 | O'Neal et al. | |
| 6,470,079 B1 * | 10/2002 | Benson | 379/114.13 |
| 6,477,374 B1 | 11/2002 | Shaffer et al. | |
| 6,480,830 B1 | 11/2002 | Ford et al. | |
| 6,519,326 B1 | 2/2003 | Milewski et al. | |
| 6,535,596 B1 * | 3/2003 | Frey et al. | 379/201.01 |
| 6,539,082 B1 * | 3/2003 | Lowe et al. | 379/114.28 |
| 6,546,005 B1 | 4/2003 | Berkley et al. | |
| 6,563,914 B1 | 5/2003 | Sammon et al. | |
| 6,564,261 B1 | 5/2003 | Gudjonsson et al. | |
| 6,577,622 B1 | 6/2003 | Schuster et al. | |
| 6,584,122 B1 | 6/2003 | Matthews et al. | |
| 6,594,352 B1 * | 7/2003 | Smith | 379/114.01 |
| 6,614,786 B1 | 9/2003 | Byers | |
| 6,625,258 B1 * | 9/2003 | Ram et al. | 379/88.13 |
| 6,717,938 B1 | 4/2004 | D'Angelo | |
| 6,724,887 B1 * | 4/2004 | Eilbacher et al. | 379/265.03 |
| 6,735,292 B1 | 5/2004 | Johnson | |
| 6,771,949 B1 | 8/2004 | Corliss | |
| 2001/0003202 A1 | 6/2001 | Mache et al. | |
| 2001/0014863 A1 | 8/2001 | Williams, III | |
| 2002/0012425 A1 | 1/2002 | Brisebois et al. | |
| 2002/0055351 A1 | 5/2002 | Elsey et al. | |
| 2002/0076026 A1 | 6/2002 | Batten | |
| 2002/0076027 A1 | 6/2002 | Bernnan et al. | |
| 2002/0077082 A1 | 6/2002 | Cruickshank | |
| 2002/0080942 A1 | 6/2002 | Clapper | |
| 2002/0083462 A1 | 6/2002 | Arnott | |
| 2002/0110121 A1 | 8/2002 | Mishra | |
| 2002/0147777 A1 | 10/2002 | Hackbarth et al. | |
| 2002/0147811 A1 | 10/2002 | Schwartz et al. | |
| 2003/0014488 A1 | 1/2003 | Dalal et al. | |
| 2003/0058838 A1 | 3/2003 | Wengrovitz | |
| 2003/0169330 A1 | 9/2003 | Ben-Shachar et al. | |
| 2004/0019638 A1 | 1/2004 | Makagon et al. | |
| 2004/0034700 A1 | 2/2004 | Polcyn | |
| 2004/0044658 A1 | 3/2004 | Crabtree et al. | |
| 2004/0249884 A1 | 12/2004 | Caspi et al. | |

FOREIGN PATENT DOCUMENTS

| | | |
|---|---|---|
| JP | 59-169264 | 9/1984 |
| JP | 2000-270307 | 9/2000 |
| WO | WO 01/11586 A1 | 2/2001 |

OTHER PUBLICATIONS

"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"Chapter 3: Overview," last updated Dec. 2, 1999, http://service.real.com/help/library/guides/g270/htmfiles/overview.htm.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"Media Tone—The 'Dial Tone' for Web Communications Services," Webex, 2003.
Business Solutions/Professional, http://www.accessline.com/business_sol/bs_professional_body.html.
"Accessline Comms' Accessline Service, The One-Number Wonder," CommWeb, http://www.cconvergence.com/article/TCM20000504S0014.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, Apr. 2003.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

"MP3 Recorder Download—MP3 Recorder—Record Audio Stream to MP3 or WAV," 2002, http://www.mp3-recorder.net.

* cited by examiner

REGISTRATION FORM

Type of User 310

Name 320

Digital Identity 330

Number 340

Payment Processing 350

| Destination 502 | Source 504 | User ID 506 | Totals 508 |
|---|---|---|---|
| | | | |

| USER ID 506 | Behavior 515 |
|---|---|
|  |  |

| USER ID 506 | Organization Name 520 |
|---|---|
| | |

METHOD AND APPARATUS FOR DIAL STREAM ANALYSIS

RELATED APPLICATIONS

Applicant claims the right to priority under 35 U.S.C. § 119(e) based on Provisional Patent Application No. 60/272,122, entitled "VOICE MAIL INTEGRATION WITH INSTANT MESSENGER," filed Feb. 27, 2001; Provisional Patent Application No. 60/272,167, entitled "DEVICE INDEPENDENT CALLER ID," filed Feb. 27, 2001; Provisional Patent Application No. 60/275,667, entitled "CALENDAR CALLING AGENT," filed Mar. 13, 2001; Provisional Patent Application No. 60/275,719, entitled "CALENDAR CALLING AGENT," filed Mar. 13, 2001; Provisional Patent Application No. 60/275,020, entitled "METHOD AND APPARATUS FOR INTEGRATED BILLING VIA PDA," filed Mar. 13, 2001; Provisional Patent Application No. 60/275,031, entitled "METHOD AND APPARATUS FOR UNIFIED COMMUNICATIONS MANAGER VIA INSTANT MESSAGING," filed Mar. 13, 2001; and Provisional Patent Application No. 60/276,505, entitled "METHOD AND APPARATUS FOR CONTEXT BASED QUERYING," filed Mar. 19, 2001, and all of which are expressly incorporated herein by reference in their entirety.

The present application also relates to U.S. patent application Ser. No. (10/083,792), entitled "VOICE MAIL INTEGRATION WITH INSTANT MESSENGER,"; U.S. patent application Ser. No. (10/083,884), entitled "DEVICE INDEPENDENT CALLER ID," U.S. patent application Ser. No. (10/083,822), entitled "METHOD AND APPARATUS FOR A UNIFIED COMMUNICATION MANAGEMENT VIA INSTANT MESSAGING," U.S. patent application Ser. No. (10/084,390), entitled "METHOD AND APPARATUS FOR CONTEXT BASED QUERYING," U.S. patent application Ser. No. (10/083,793), entitled "METHOD AND APPARATUS FOR CALENDARED COMMUNICATIONS FLOW CONTROL," U.S. patent application Ser. No. (10/084,121), entitled "CALENDAR-BASED CALLING AGENTS," and U.S. patent application Ser. No. (10/083,798), entitled "METHOD AND APPARATUS FOR INTEGRATED BILLING VIA PDA," and all of which are expressly incorporated herein by reference in their entirety.

FIELD OF THE INVENTION

The present invention relates generally to analyzing behavior based upon phone calls and, more particularly, to analyzing dial streams.

BACKGROUND OF THE INVENTION

Many businesses use a wide variety of advertising and marketing techniques. These techniques are focused on identifying potential sale leads, conducting market research, and promoting various products. Typically, businesses conduct advertising and marketing using mass marketing, such as, commercials, flyers, billboards, etc. Unfortunately, many consumers ignore such advertising and marketing information. In addition, a consumer's response (if any) to such advertising and marketing information may be delayed. Thus, a business or organization may be unable to determine which advertisement was effective in generating consumer interest.

Even if a consumer is interested in a particular product or subject, there are few mechanisms available that effectively alert the appropriate business. Typically, a consumer must proactively notify the business or organization of the interest, e.g., via a personal appearance at a store or browsing a particular website. Consequently, businesses are forced to use inefficient techniques to advertise and market to consumers. Accordingly, it would be desirable to provide techniques where a consumer's interest can be effectively analyzed.

SUMMARY OF THE INVENTION

In accordance with the principles of the present invention, a method for processing a call connection from a calling party to a called party comprises: making at least one analysis request; receiving a request for the call connection, the call connection being associated with the at least one analysis request; recording dial stream information derived from the call connection; and analyzing the recorded dial stream information to generate a result for the at least one analysis request.

In accordance with another embodiment consistent with the principles of the present invention, an apparatus for processing a call connection from a calling party to a called party comprises: a receiver for receiving a request for the call connection, the call connection associated with at least one analysis request; a recorder for recording dial stream information derived from the call connection; and an analyzer for analyzing the recorded dial stream information to generate a result for the analysis request.

In accordance with another embodiment consistent with the principles of the present invention, a system for processing a call connection from a calling party to a called party comprises: means for receiving a request for the call connection, the call connection associated with at least one analysis request; means for recording dial stream information derived from the call connection; and means for analyzing the recorded dial stream information to generate a result for the analysis request.

In accordance with another embodiment consistent with the principles of the present invention, a computer readable medium capable of configuring a computer to perform a method of processing a call connection from a calling party to a called party. The method comprises: receiving a request for the call connection, the call connection associated with at least one analysis request; recording dial stream information derived from the call connection; and analyzing the recorded dial stream information to generate a result for the analysis request.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 3 is exemplary screen shots in accordance with methods and apparatus consistent with the principles of the present invention;

FIGS. 5a–5c illustrate the information stored in a database used by the analysis server consistent with methods and apparatus consistent with the present invention;

DETAILED DESCRIPTION

Methods and apparatus consistent with the present invention enable companies to better market products and services by capturing information associated with callers and called parties and providing companies interested in marketing products and services to the callers and called parties access to this information.

In one implementation, consistent with certain aspects of the present invention, when a called party receives a call from a caller associated with a company known to market a particular type of goods or services, certain basic information on the call is recorded in a database. Such information may be referred to as a "dial stream." The recorded information may include the name of the calling company, the type of goods or service marketed by that company, identifying information for the called party, and duration of the call. Generally speaking, this is the type of information that can be derived without input from the calling company or the called party. For example, the identity of each party can be derived from a telephone number associated with the device used by each party in connection with a call, i.e., the caller's telephone number and the called party's telephone number. Although configurations consistent with the principles of the present invention may utilize information obtained from the calling company, the called party, or a party associated with either.

Available references may be used to determine the other basic information. Other information may also be recorded depending on the level of cooperation with the calling company and the called party. For example, the called party may provide additional information to be recorded. Such information may reflect the called party's interest in the calling company's products or services. The called party may be compensated for allowing the basic and/or additional information to be recorded. Also, the calling company may facilitate recordation of additional information associated with the call, such as information indicating the purpose of the call. Similarly, the calling company may be compensated for the additional information through a specific payment or access to certain recorded information.

Reference will now be made in detail to exemplary embodiments of the present invention, examples of which are illustrated in the accompanying drawings. Wherever possible, the same reference numbers will be used throughout the drawings to refer to the same or like parts.

Figure 1:
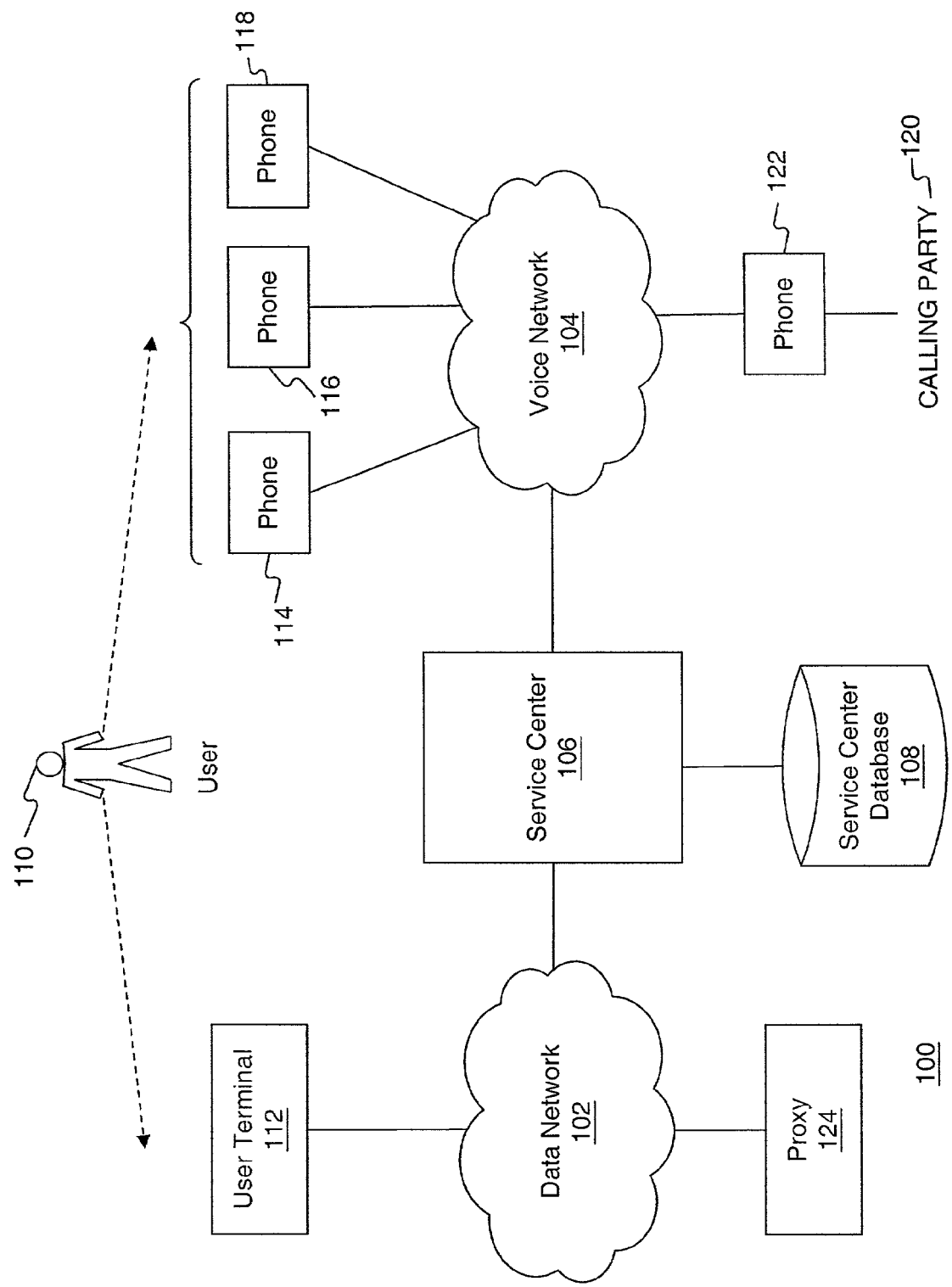
FIG. 1 is a block diagram of a data processing and telecommunications environment, in accordance with methods and apparatus consistent with the principles of the present invention.

FIG. 1 is a block diagram of a data processing and telecommunications environment, in accordance with methods and apparatus consistent with the principles of the present invention. The data processing and telecommunications environment 100 may include a data network 102, a voice network 104, a service center 106, and a service center database 108. As shown, a user 110 may use a user terminal 112 to interface data network 102. In addition, user 110 may use phones 114, 116, and 118 to interface with voice network 104. For example, calling party 120 may use phone 122 to call user 110 at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. For example, data network 102 may be implemented on a network, such as the Internet.

Voice network 104 provides telephony services, for example, to allow calling party 120 to place a telephone call to user 110. For example, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both the PSTN and VoIP technology consistent with the principles of the present invention. Voice network 104 is described in further detail with reference to FIG. 6.

Service center 106 provides a platform for managing communications over data network 102 and voice network 104. In addition, service center 106 provides gateway functions, such as code and protocol conversions, to transfer communications between data network 102 and voice network 104. Service center 106 may be implemented using a combination of hardware and software. For example, service center 106 may be implemented using a plurality of a general purpose computers or servers coupled by a network (not shown). Although service center 106 is shown with direct connections to data network 102 and voice network 104, any number and type of network elements may be interposed between service center 106, data network 102, and voice network 104. Service center 106 is described in further detail with reference to FIG. 4.

Service center database 108 contains information regarding user 110. For example, service center database 108 may contain information including, an identifier for user 110, a password, one or more email addresses for user 110, one or more instant messaging identifiers for user 110, and one or more telephone numbers, such as for phones 114, 116, and 118. Additionally, service center database 108 may contain configuration information that indicate rules for how and when communications are forwarded, such as telephone calls over voice network 104. Service center database 108 may be implemented as an Oracle™ database using a combination of known hardware and software, such as Proliant™ servers and EMC storage devices.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. IM is a communications service implemented over the Transmission Control Protocol and Internet Protocol ("TCP/IP") suite to create a private communication channel. Although there is no accepted universal IM standard, an appropriate IM model may be found in RFC 2778, M. Day et al., The Internet Society (2000), titled "A Model for Presence and Instant Messaging," which describes, inter alia, a model for providing instant messaging services. There are several known IM systems including America OnLine Instant Messenger ("AIM") and Microsoft Network Messenger Service ("MSNMS"). In addition to IM services, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

User terminal 112 may communicate directly with service center 106. For example, a client application may be installed on user terminal 112, which directly communicates with service center 106. Alternatively, user terminal 112 may communicate with service center 106 via proxy 124. User terminal 112 is described in further detail with reference to FIG. 2.

Proxy 124 provides an intermediate communications service for user terminal 112 and service center 106. Proxy 124 may act on behalf of user 110 to interface service center 106 and provides functions, such as authentication services, and protocol translation services. For example, user 110 may be a MSNMS subscriber and proxy 124 may be a MSNMS server. User 110 may then use MSNMS IM services to indirectly interface service center 106. As another example, proxy 124 may be a web site. User 110 may provide information, such as information for call forwarding patterns, to proxy 124 via web pages and secured using secured sockets layer ("SSL"). Proxy 124 may then establish an SSL session with service 106 and provide the information from user 110.

Phones 114, 116, 118, and 122 interface voice network 104. Phones 114, 116, 118, and 122 may be implemented using known devices, including wireline phones and mobile phones, such as wireless phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
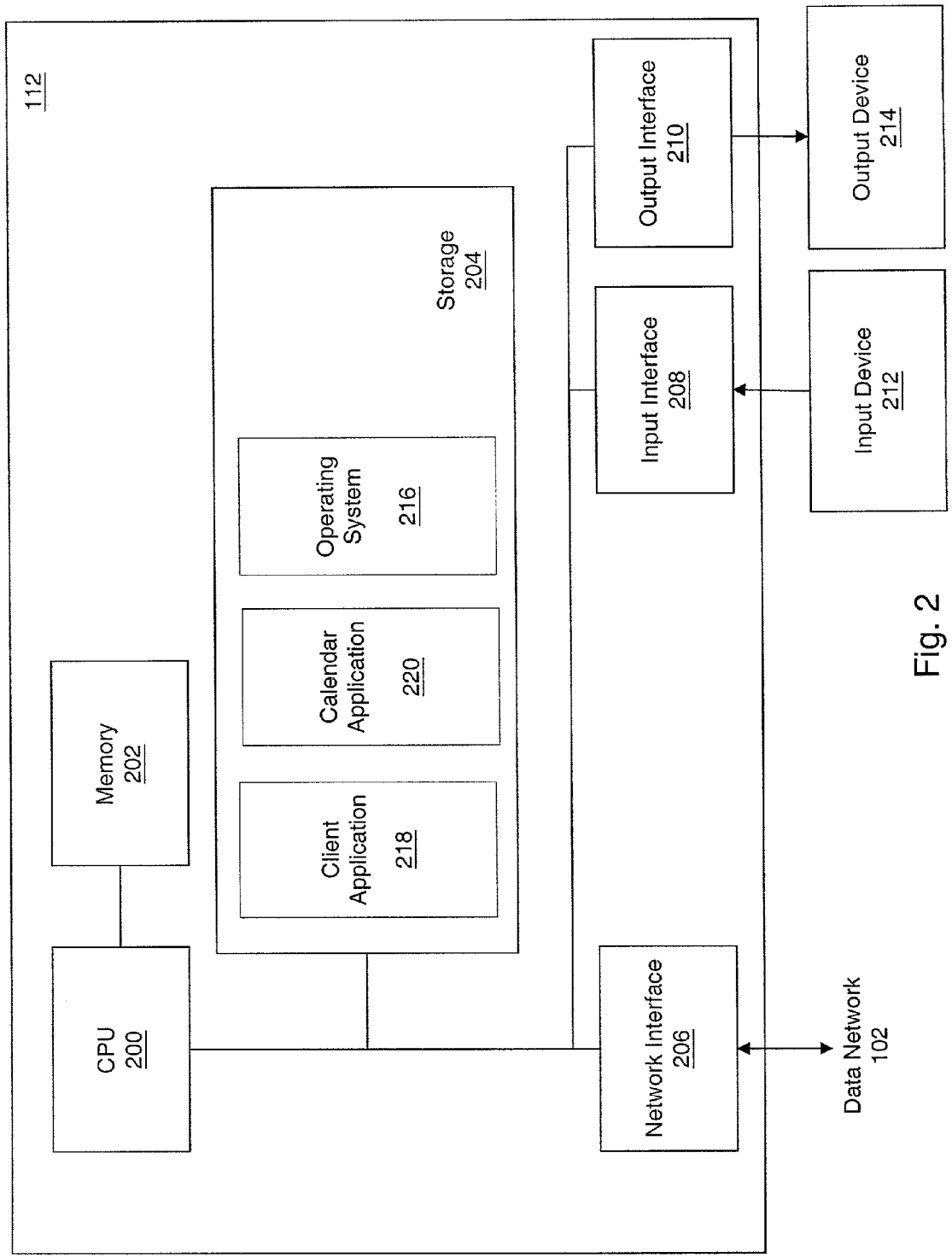
FIG. 2 is a block diagram of a user terminal, in accordance with methods and apparatus consistent with the principles of the present invention.

FIG. 2 is a block diagram of a user terminal, in accordance with methods and apparatus consistent with the principles of the present invention. As shown, user terminal 112 includes a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. For example, CPU 200 may be implemented using a Pentium™ processor provided from Intel Corporation.

Memory 202 provides a primary memory for CPU 200, such as for program code. Memory 202 may be embodied with a variety of components of subsystems, including, a random access memory ("RAM"), and a read-only memory ("ROM"). For example, when user terminal 112 executes an application installed in storage module 204, CPU 200 may download at least a portion of the program code from storage module 204 into memory 308. As CPU 200 executes the program code, CPU 200 may also retrieve additional portions of program code from storage module 204.

Storage module 204 provides mass storage for user terminal 112. Storage module 204 may be implemented with a variety of components or subsystems including, for example, a hard drive, an optical drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 includes program code for a calendar application 220, such as GroupWise provided by Novell Corporation, or Outlook provided by Microsoft Corporation; a client application 218, such as a MSNMS client, or AIM client; and an Operating System (OS) 216, such as the Windows Operation System provided by Microsoft Corporation. In addition, storage module 204 may include other program code and information (not shown), such as program code for TCP/IP communications; kernel and device drivers; configuration information, such as a Dynamic Host Configuration Protocol (DHCP) configuration; a web browser, such as Internet Explorer provided by Microsoft Corporation, or Netscape Navigator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

FIG. 3 is a screen shot of a registration form 300 for an individual or business to subscribe to the dial stream analysis service. Registration form 300 includes a type of user entry field 310, a name field 320, a digital identity field 330, a number field 340, and a payment processing field 350.

Type of user entry field 310 can be a selection box that allows a user to select between a business user or an individual user. A business user can be a user who wants a particular dial stream analyzed. A dial stream is information or data derived from the connection or attempted connection between a calling party and a called party. An individual user can be a customer who allows a dial stream terminating at one of their interfaces with the voice network to be analyzed. For example, the user may allow information about their usage patterns to be detected and recorded. Name field 320 allows the business or individual user to enter a name. The name can be an organizational name or a personal name. Information gathered in name field 320 can include other contact information, such as address information. Digital identity field 330 allows the business or individual to enter a digital identity for which all transactions under their name are performed. An example of a digital identity can be a registration name and password.

Number field 340 allows the business to indicate the numbers or connections that it wishes to have analyzed. Number field 340 allows the individual to list the numbers they are allowing the system to access. Payment processing field 350 allows the business to specify what type of information they want from the service, raw data, processed data, or other types of results, and how they plan on purchasing the data. Payment processing field 350 allows the individual to specify how they wish to be compensated for allowing access to their information.

Service center 106 uses the payment processing information gathered in registration form 300 to bill for the dial stream analysis service. For businesses the billing may include a variety of methods, including prepaid, subscription or hierarchical or tiered billing structures. One embodiment of the invention may use a prepaid model. While service might be provided on a transaction by transaction basis, the services performed may also be sold in blocks. Services can include getting data and providing it in raw form or processing the data and generating results based on an analysis of the data. The user might pay for a block of services using a credit card, or may pay on a subscription basis. The subscription basis can provide a user access to the service on a monthly, bimonthly, semiannual, or annual basis after payment of a fixed fee for a either unlimited service or a tiered approach. A user may pay a fixed amount of money for a thousand services and then anything over the thousand services can be charged on another basis, such as on a per hundred or a tiered approach. Compensation for the individual who allows their information to be gathered, may be based on a monthly, per use, tiered schedule, or based on a discount for other services.

Registration form 300 is exemplary and not all fields need to appear on the form. For example, the fields can be placed into separate forms and certain fields can be omitted.

Figure 4:
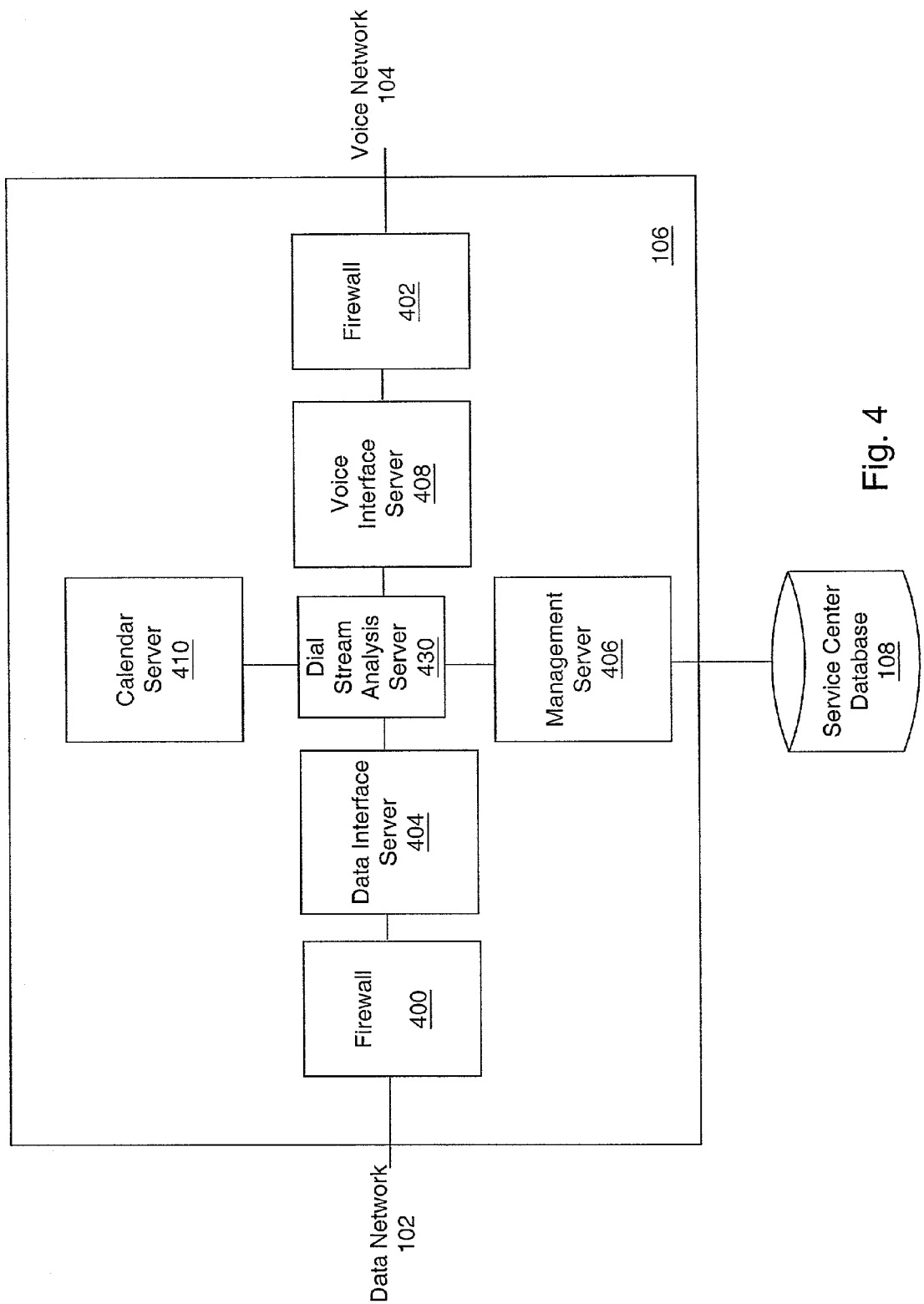
FIG. 4 is a block diagram of a service center, in accordance with methods and apparatus consistent with the principles of the present invention.

FIG. 4 is a block diagram of a service center, in accordance with methods and apparatus consistent with the principles of the present invention. Service center 106 is a gateway device, connecting voice network 104 to data network 102. As shown, service center 106 includes firewalls 400 and 402, a data interface server 404, a management server 406, a voice interface server 408, a calendar server 410, and a dial stream analysis server 430.

Firewalls 400 and 402 provide security services for communications between service center 106 and data network 102, and between service center 106 and voice network 104, respectively. For example, firewalls 400 and 402 may restrict communications between user terminal 112 and one or more servers within service center 106. Any security policy may be implemented in firewalls 400 and 402 consistent with the principles of the present invention. Firewalls 400 and 402 may be implemented using a combination of known hardware and software, such as the Raptor Firewall provided by the Axent Corporation. Furthermore, firewalls 400 and 402 may be implemented as separate machines within service center 106, or implemented on one or more machines external to service center 106.

Data interface server 404 provides interface services between service center 106 and user terminal 112. For example, data interface server 404 may exchange TCP/IP communications, such as IM communications or XML information which include call forwarding patterns from user 110. Data interface server 404 may also interface proxy 124 to indirectly exchange communications with user terminal 112.

Management server 406 controls operation of service center 106 and provides access services to service center database 108. For example, management server 406 may store information, such as call forwarding patterns, received from data interface server 404 into service center database 108. Management server 406 may also service queries to service center database 108, for example, from data interface server 404 or voice interface server 408.

Voice interface server 408 provides interface services between service center 106 and voice network 104. For example, voice interface server 408 may exchange information, such as call forwarding patterns, between service center database 108 and voice network 104. Voice interface server 408 may provide the information to voice network 104 using one or more protocols. For example, voice interface server 408 may use TCP/IP, or the Signaling System 7 ("SS7") protocol.

SS7 is a telecommunications protocol defined by the International Telecommunication Union ("ITU"). SS7 is an "out-of-band" signaling protocol using a system of nodes called Service Switching Points ("SSP"), Signal Transfer Points ("STP"), and Service Control Points ("SCP"). "Out-of-band signaling" is signaling that does not take place over the same path between switching elements as the connection, and instead uses separate digital channels between SS7 nodes. SS7 allows voice network 104 to provide enhanced functions, such as call forwarding; caller-ID; three-way calling; wireless services such as roaming and mobile subscriber authentication; local number portability; and toll-free/toll services.

Dial stream analysis server 430 can monitor dial streams in voice network 104. Dial stream analysis server 430 can also monitor attempted calls, and the calls that are accepted and rejected. Server 430 can monitor the length of time a particular dial stream is active on accepted calls and the frequency of calls to a called party or from a calling party. For each called party or calling party, dial stream analysis server 430 may send requests to SCP 600 to obtain Caller ID information from a configuration database 614. Dial stream analysis server 430 may use either the Caller ID information or information from registration form 300 to create a record of the dial stream and associate it with a particular user stored in service center database 108.

Calendar server 410 provides services to calendar application 220 on user terminal 112. For example, calendar server 410 may provide email services, directory services, and calendar information, such as schedule information, to user terminal 112. Calendar server 410 may operate in conjunction with data interface server 404 to exchange, for example, call forwarding patterns with user terminal 112.

Although FIG. 4 shows separate servers within service center 106, service center 106 may be implemented using any combination of hardware and software. For example, service center 106 may implement data interface server 404, management server 406, voice interface server 408, calendar server 410, and dial stream analysis server 430 as software applications installed on a single machine. In addition, service center 106 may access one or more servers remotely across a network.

Figure 5B:
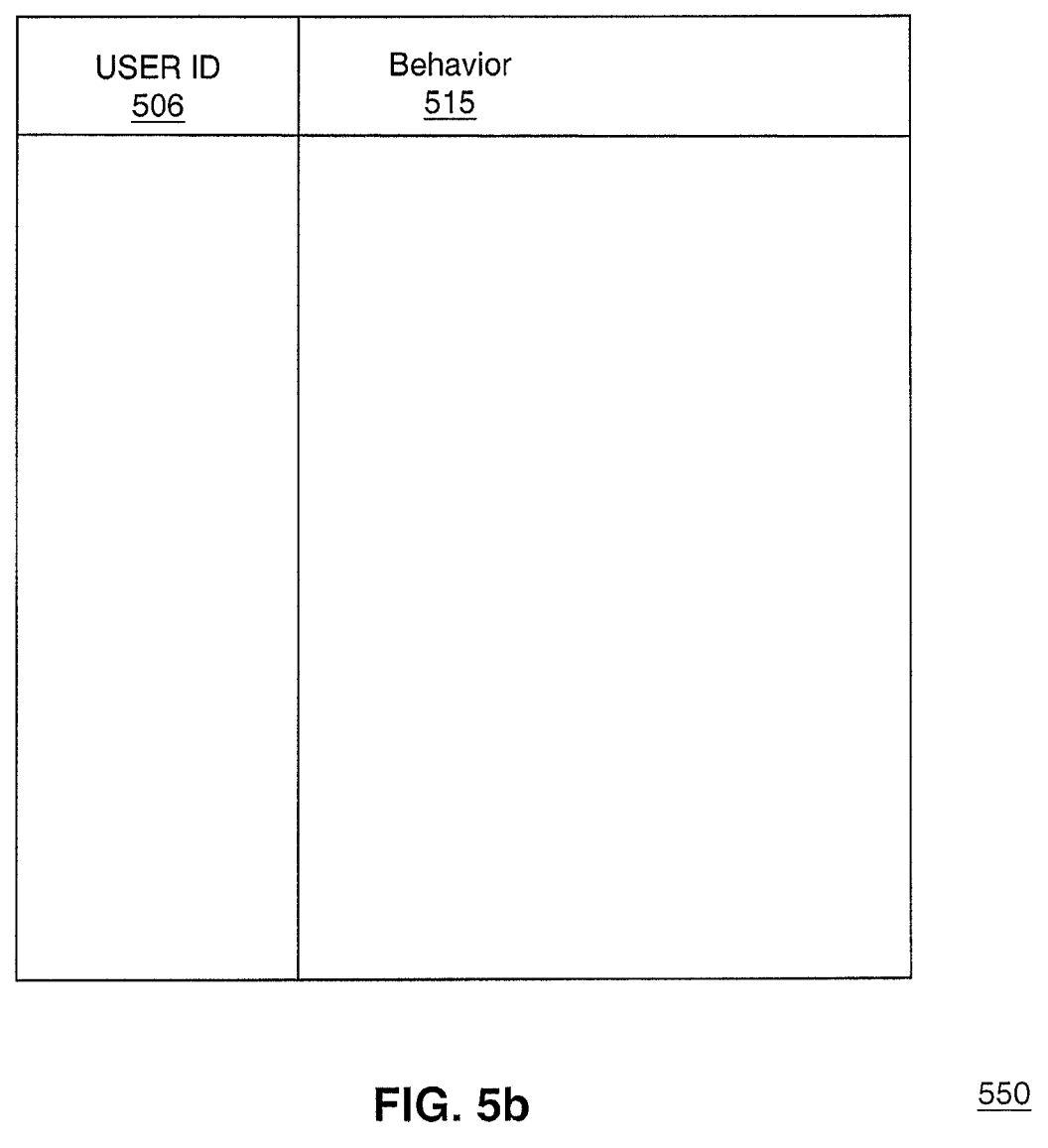
Figure 5C:
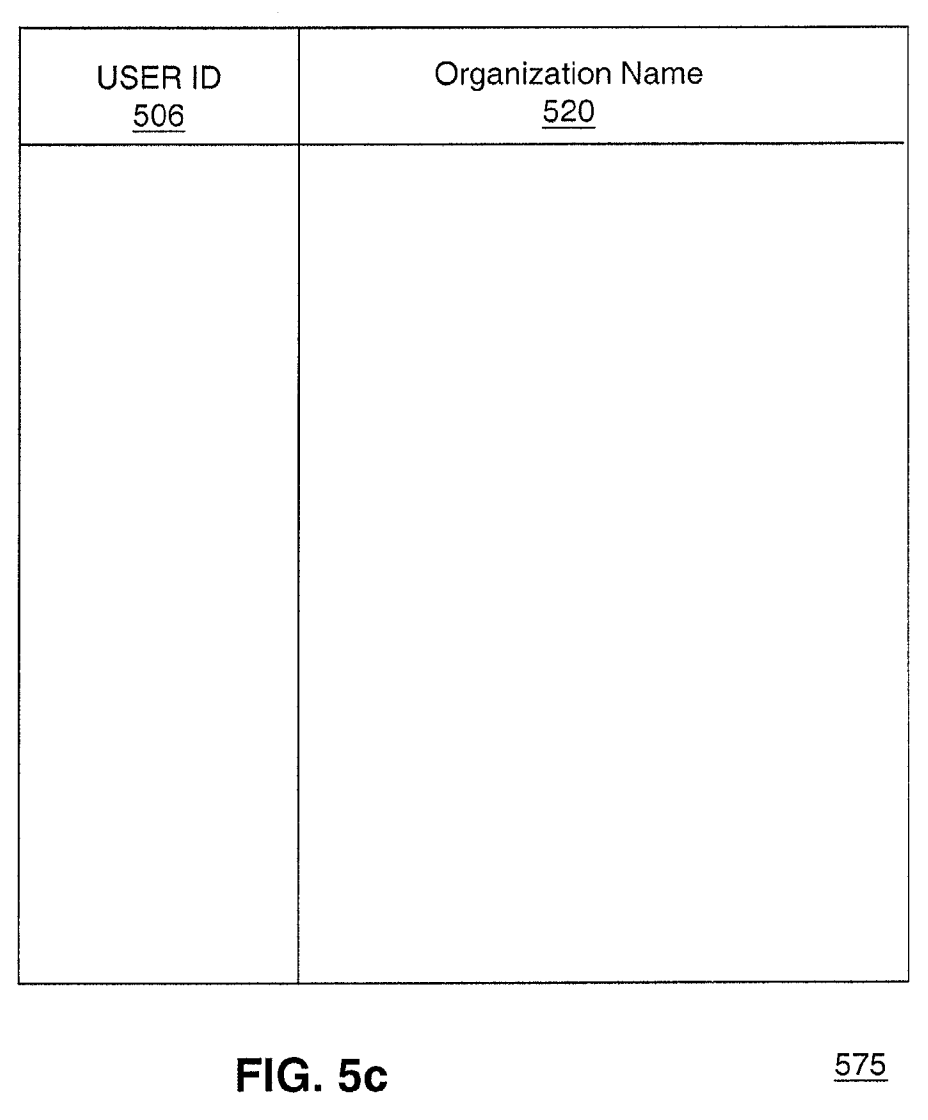

FIGS. 5*a*–5*c* illustrate the information stored in a service center database 108 used by the dial stream analysis server 430 consistent with methods and apparatus consistent with the present invention. In FIG. 5*a*, a record table 500 can be stored in service center database 108 having a destination column 502, a source column 504, a user ID column 506, and a totals column 508. In FIG. 5b, a record table 550 can also be stored in service center database 108 having a user ID column 506 and a behavior 515. In FIG. 5c, a record table 575 can also be stored in service center database 108 having a user ID column 506 and a organization name 520.

Destination column 502 identifies various destinations, e.g., destination 106 which have received calls or call attempts from various sources, e.g., calling party 120. Sources column 504 identifies those sources, e.g., calling party 120, which have made or attempted calls to various destinations, e.g., phone 114. Destination column 502 and source column 504 may include the PODP number for phone 114 and calling party 120, respectively. Alternatively, SDS numbers may be used. However, any numbering formats may be used, for example, names such as, John Smith or Joe's Pizza, may be used instead of numbers. Additionally, columns 502 and 504 may be used to identify various sources and destinations which had unsuccessful call attempts as well as successful call attempts.

User ID column 506 identifies one or more users associated with phone 114. For example, a user ID may be used to determine an account for phone 114 to which a credit, if any, will be paid in exchange for allowing analysis of it's incoming/outgoing calls. In addition, user ID column 506 allows dial stream analysis server 430 to correlate multiple source or destination numbers to a particular user. For example, a business may have multiple phone numbers or extensions. In addition, an individual may have various phone numbers for home, work, wireless, etc.

Totals column 508 indicates the totals, if any, associated with a particular destination, e.g., phone 114. For example, totals column 508 may indicate the number of incoming/outgoing calls between calling party 120 and phone 114. Behavior 514 indicates behavior associated with a user ID indicated by column 506. Behavior 515 may be the duration of the call, the number of rings before pickup or an analysis of the dial stream performed by dial stream analysis server 430. Data on the dial stream such as length of call, frequency of call, number of calls attempted, or number of successful calls is gathered. For example, for a company, analysis of calls from different telemarketer phones can be tracked to determine which calling parties are most successful. The data can be analyzed to determine successful time ranges. If the dial stream analysis server 430 has access via service center database 108 to more information on the called parties, such as job history or house value, this information can be used to make further correlations of success.

Organization name 520 indicates an organization, if any, associated with a particular user, as indicated in user ID column 506. The organization name information may come from a user registration or from the voice network 104 configuration database 614 (described in FIG. 6).

Figure 6:
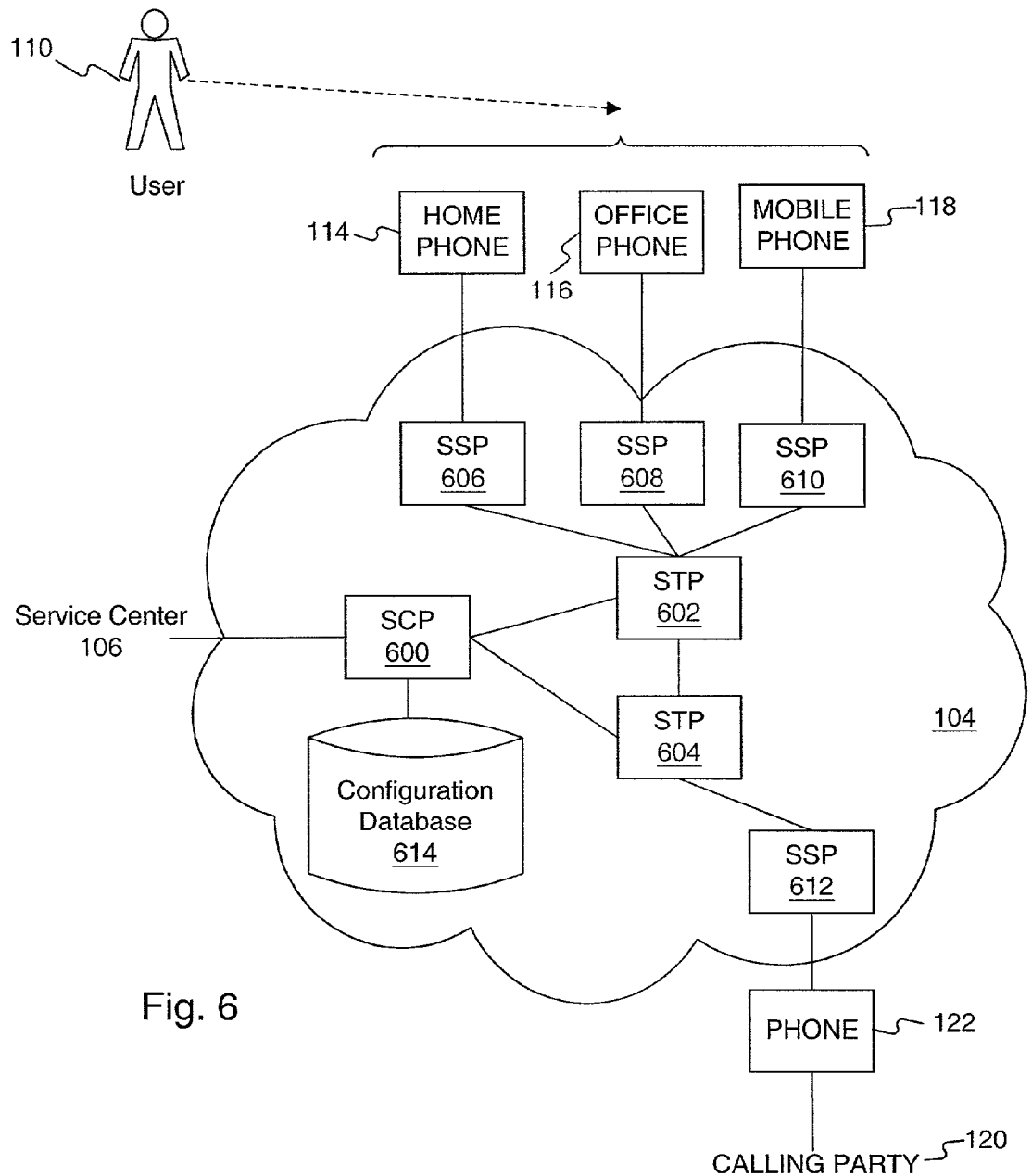
FIG. 6 is a block diagram of a voice network, in accordance with methods and apparatus consistent with the principles of the present invention.

FIG. 6 is a block diagram of a voice network, in accordance with methods and apparatus consistent with the principles of the present invention. As shown, voice network 104 includes a service control point ("SCP") 600, service transfer points ("STP") 602 and 604, service switching points ("SSP") 606, 608, 610, and 612, and a configuration database 614.

Voice network 104 may be implemented using the PSTN and SS7 as a signaling protocol. As noted above, the SS7 protocols allows voice network 104 to provide features, such as call forwarding; caller-ID; three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between SCP 600 and SSPs 606, 608, 610, and 612.

SCP 600 provides interface services into configuration database 614 related to processing of calls within voice network 104, and interface services between voice interface server 408. SCP 600 provides translation and routing services of SS7 messages to support the features of voice network 104, such as call forwarding. In addition, SCP 600 may exchange information voice interface server 408 in service center 106 using TCP/IP or SS7. For example, SCP 600 may receive configuration information from voice interface terminal 408 which requests one or more call forwarding patterns in voice network 104. SCP 600 may then configure the call forwarding patterns in voice network 104 using one or more SS7 messages, such as TCAP messages, to set triggers in SSPs 606, 608, 610, and 612.

SCP 600 may be implemented using a combination of known hardware and software. Although SCP 600 is shown with a direct connection to service center 106, any number of network elements including routers, switches, hubs, etc. may be used to connect SCP 600 and service center 106.

STPs 602 and 604 relay SS7 messages within voice network 104. For example, STP 602 may route SS7 messages between SSPs 606, 608, 610, and 612. STP 602 and 604 may be integrated as adjunct to an SSP, e.g., SSPs 606, 608, 610, and 612, or may be implemented as a separate machine. In addition, STP 602 and 604 may provide security functions, such as security checks on incoming/outgoing SS7 messages. STP 602 may also provide other functions, such as acquisition and storage of traffic/usage statistics. STP 602 may be implemented using known hardware and software from manufacturers such as NORTEL™ and LUCENT Technologies™.

SSPs 606, 608, 610, and 612 provide an interface between voice network 104 and phones 114, 116, 118, and 122, respectively, to setup, manage, and release telephone calls within voice network 104. SSPs 606, 608, 610, and 612 may be implemented as a voice switch, an SS7 switch, or a computer connected to a switch. SSPs 606, 608, 610, and 612 exchange SS7 signal units to support a telephone call between calling party 120 and user 110. For example, SSPs 606, 608, 610, and 612 may exchange SS7 messages, such as TCAP messages, within message signal units ("MSU") to control calls, perform database queries to configuration database 614, and provide maintenance information.

Configuration database 614 comprises one or more known databases to support the features of voice network 104. For example, configuration database 614 may include a call management service database; a line information database (LIDB); a business services database; a home location register; and a visitor location register.

Figure 7:
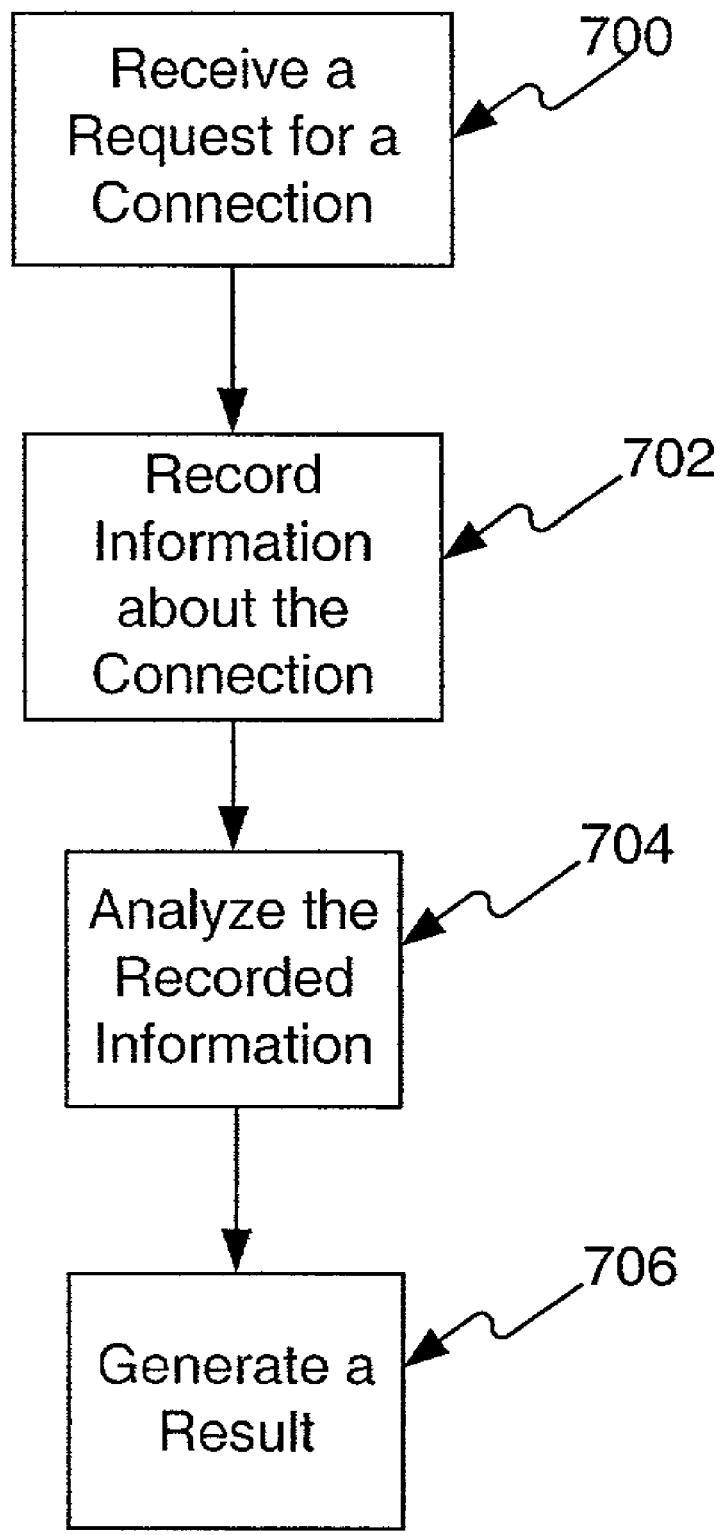
FIG. 7 is a flow diagram illustrating a method of providing dial stream analysis in accordance with methods and apparatus consistent with the principles of the present invention.

FIG. 7 is a flow diagram illustrating a method of providing dial stream analysis in accordance with methods and apparatus consistent with the principles of the present invention. Dial stream analysis server 430 receives a request for a connection (step 700). The attempted connection is between a calling party and a called party. For example, the calling party can be the source 504 in record table 500 and the called party can be destination 502 in record table 500. Dial stream analysis server 430 can look up information in service center database 108 to determine a User ID 506 to associate with the connection request. Dial stream analysis server 430 records information about the connection (step 702). The information recorded can include Caller ID information on the called party and the calling party, if the connection was accepted or rejected, the duration of the connection. This information can be stored in the behavior 515 column in record 550. Other information about the called party and the calling party can be looked up in service center database 108, such as Organization Name 520 for the called party.

Dial stream analysis server 430 analyzes the recorded information (step 704). For example a business, such as a telemarketing business, can request that all calls made from their call center be tracked. The telemarketer may ask the dial stream analysis sever 430 to analyze the recorded information to determine during what time period the most number of calls are accepted. The dial stream analysis server 430 generates a result (step 706). The result can be mailed to the business using standard paper mail or the business can connect to the dial stream analysis server 430 via data network 102 using user terminal 112.

Figure 8:
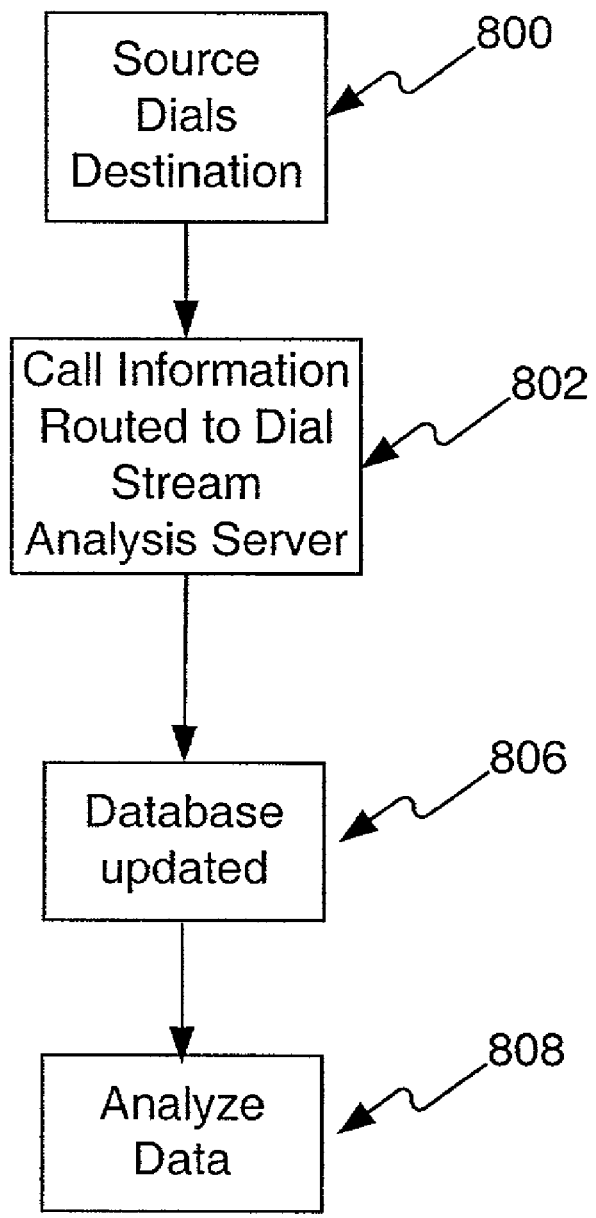
FIG. 8 is a flow diagram illustrating another method of providing dial stream analysis in accordance with methods and apparatus consistent with the principles of the present invention.

FIG. 8 is a flow diagram illustrating another method of providing dial stream analysis in accordance with methods and apparatus consistent with the present invention. Calling party 120, a source 504, originates a call by dialing the phone number for a called party phone 114, destination 502 (step 800). SSP 612 receives the dialing signals from calling party 120 and sends call request signaling to STP 604. STP 604 then determines the associated STP for phone 114, i.e., STP 602.

Call information is routed to a dial stream analysis server 430 (step 802). STP 602 receives the call request signaling information and routes it to SCP 600. SCP 600 queries one or more of it's databases, e.g., a line information database, such as configuration database 614, to determine caller ID information. SCP 600 may then forward the caller ID information and called party identifier to dial stream analysis server 430. Dial stream analysis server 430 utilizes a processor and a signaling module to determine the destination, e.g., phone 114 and the source of the call, e.g., calling party 120.

Dial stream analysis server 430 updates database (step 806). The call attempt between calling party 120 and phone 114 is recorded in service center database 108, in record 550, charting behavior 515. Service center database 108 is also updated at subsequent stages of the call, e.g., call attempt successful and call terminated. Furthermore, service center database 108 may be continuously updated by dial stream analysis server 430 according to the behavior 515 of calling party 120 or phone 114. For example, service center database 108 may indicate, e.g., the types of businesses from which calling party 120 has accepted calls. However, any of a wide variety of algorithms and data may be used to track and record calls consistent with the principles of the present invention.

The data updated in the database is analyzed (step 808). Dial stream analysis server 430 provides an analysis of registry and information recorded in service center database 108. Dial stream analysis server 430 may provide the analysis to any recipient. For example, a telephone service provider operating telephone network 104 may receive the analysis. The telephone service provider may then offer the information to businesses, marketing organizations, etc. that are interested in analyzing call behavior. Prior to releasing the analysis information, the telephone service provider may also request permission from persons associated with either calling party 120 and phone 114. For example, a consumer may register with dial stream analysis server 430 or the telephone service provider in exchange for compensation. A business or organization may also register in order to have their incoming/outgoing calls analyzed. Dial stream analysis server 430 may also format the analysis such that specific identities of either calling party 120 or phone 114 remain anonymous.

Although aspects of one implementation are depicted as being stored in memory, one skilled in the art will appreciate that all or part of methods and apparatus consistent with the present invention may be stored on or read from other computer-readable media, such as secondary storage devices, like hard disks, floppy disks, and CD-ROM. In addition, although specific components of a telecommunications network and analysis server have been described, one skilled in the art will appreciate that the methods and apparatus consistent with the present invention may contain additional or different components. Other embodiments and modifications of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving at least one analysis request from a requesting party;
   receiving a request for a call connection from a calling party that differs from the requesting party to a called party, the call connection request being associated with the at least one analysis request;
   recording dial stream information derived from the call connection request;
   determining whether to establish the call connection;
   recording dial stream information derived from the call connection while the call connection is established;
   analyzing the recorded dial stream information derived from at least one of the call connection request and the call connection to generate a result for the at least one analysis request; and
   providing the result to the requesting party.

2. The method according to claim 1, wherein the at least one analysis request is associated with at least one product or service.

3. The method according to claim 2, wherein the result for the analysis request determines a level of interest in the at least one product or service.

4. The method according to claim 1, further comprising:
   prior to providing the result to the requesting party, requesting permission to provide the result to the requesting party.

5. The method according to claim 1, further comprising:
   billing the requesting party for the result.

6. A system comprising:
   means for receiving at least one analysis request from a requesting party;
   means for receiving a request for a call connection from a calling party that differs from the requesting party to a called party, the call connection request being associated with the at least one analysis request;
   means for recording dial stream information derived from the call connection request;
   means for determining whether to establish the call connection;
   means for recording dial stream information derived from the call connection while the call connection is established;
   means for analyzing the recorded dial stream information derived from at least one of the call connection request and the call connection to generate a result for the at least one analysis request; and means for providing the result to the requesting party.

7. The system according to claim 6, wherein the at least one analysis request is associated with at least one product or service.

8. The system according to claim 7, wherein the result for the analysis request determines a level of interest in the at least one product or service.

9. The system according to claim 6, further comprising:
means for requesting permission to provide the result to the requesting party prior to providing the result to the requesting party.

10. The system according to claim 6, further comprising:
means for billing the requesting party for the result.

11. An apparatus comprising:
a receiver for receiving a request for a call connection from a calling party to a called party, the call connection request being associated with at least one analysis request;
a processor for determining whether to establish the call connection;
a recorder for recording dial stream information derived from the call connection request and for recording dial stream information derived from the call connection while the call connection is established;
an analyzer for analyzing the recorded dial stream information derived from at least one of the call connection request and the call connection to generate a result for the analysis request; and
a transmitter for providing the result to a requesting party that differs from the calling party.

12. The apparatus according to claim 11, further comprising:
a requester for requesting permission to provide the result to the requesting party prior to providing the result to the requesting party.

13. The apparatus according to claim 11, further comprising:
a billing system for billing the receiving party for the result.

14. A system for processing calls, comprising:
means for receiving a request to initiate a call from a calling party, including information sufficient to identify a device associated with a called party;
means for associating at least one analysis request with the call request;
means for recording dial stream information associated with the call;
means for analyzing the recorded dial stream information and producing a result of the analysis;
means for requesting permission to provide the result of the analysis to a recipient that differs from the calling party, such that the result of the analysis is provided to the recipient in response to the analysis request.

15. The method of claim 1, wherein the at least one analysis request is received as data transmitted over a data network.

16. The method of claim 1, wherein the dial stream information includes a calling party number, a called party number, and a duration of the call connection.

17. The method of claim 1, wherein the dial stream information includes a calling party identifier, a called party identifier, whether the call connection was established, and a duration of the call connection.

18. A computer readable medium storing instructions executable by a processor that when executed by the processor, cause the processor to perform the method of claim 1.

19. A method comprising:
receiving a call connection request, the call connection request for a call connection between a first party and a second party, the first party permitting dial stream recording;
recording dial stream information associated with the call connection request in a record associated with the first party;
determining whether to establish the call connection;
recording dial stream information associated with the call connection in the record associated with the first party;
performing dial stream analysis using the record associated with the first party.

20. The method according to claim 19, further comprising:
providing a result of the dial stream analysis to a requesting party.

21. The method according to claim 20, further comprising:
requesting permission of the first party to provide the result to the requesting party prior to providing the result to the requesting party.

22. The method of claim 19, wherein the dial stream information includes a number of the first party, a number of the second party, and a duration of the call connection.

23. The method of claim 19, wherein the dial stream information includes a first party identifier, a second party identifier, whether the call connection was established, and a duration of the call connection.

24. A computer readable medium storing instructions executable by a processor that, when executed by the processor, cause the processor to perform the method of claim 19.

* * * * *